(12) United States Patent
Kim et al.

(10) Patent No.: US 12,056,909 B2
(45) Date of Patent: Aug. 6, 2024

(54) METHOD AND APPARATUS FOR FACE RECOGNITION ROBUST TO ALIGNMENT STATUS OF THE FACE

(71) Applicant: ELECTRONICS AND TELECOMMUNICATIONS RESEARCH INSTITUTE, Daejeon (KR)

(72) Inventors: Hyungil Kim, Daejeon (KR); Kimin Yun, Daejeon (KR); Yongjin Kwon, Daejeon (KR); Jin Young Moon, Daejeon (KR); Jongyoul Park, Daejeon (KR); Kang Min Bae, Daejeon (KR); Sungchan Oh, Seoul (KR); Youngwan Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 344 days.

(21) Appl. No.: 17/513,441

(22) Filed: Oct. 28, 2021

(65) Prior Publication Data
US 2022/0129689 A1 Apr. 28, 2022

(30) Foreign Application Priority Data

Oct. 28, 2020 (KR) .................. 10-2020-0141530

(51) Int. Cl.
*G06V 10/24* (2022.01)
*G06F 18/21* (2023.01)
(Continued)

(52) U.S. Cl.
CPC ............ *G06V 10/24* (2022.01); *G06F 18/213* (2023.01); *G06F 18/214* (2023.01);
(Continued)

(58) Field of Classification Search
CPC ...... G06V 10/24; G06V 10/82; G06V 40/168; G06V 40/172; G06V 40/161;
(Continued)

(56) References Cited

U.S. PATENT DOCUMENTS 9,747,493 B2 8/2017 Rodriguez et al.
10,095,917 B2 10/2018 Taigman et al.
(Continued)

FOREIGN PATENT DOCUMENTS

KR 10-1589149 2/2016
KR 10-2019-0093714 8/2019
(Continued)

OTHER PUBLICATIONS

Chen et al, FSRNet: End-to-End Learning Face Super-Resolution with Facial Priors, 2017, arXiv:1711.10703v1, pp. 1-12. (Year: 2017).*

(Continued)

*Primary Examiner* — Aaron W Carter
*Assistant Examiner* — Kathleen M Broughton
(74) *Attorney, Agent, or Firm* — KILE PARK REED & HOUTTEMAN PLLC

(57) ABSTRACT

A method and apparatus for face recognition robust to an alignment of the face comprising: estimating prior information of a facial shape from an input image cropped from an image including a face using the first deep neural network (DNN); extracting feature information of facial appearance from the input image by using a second DNN; training, by using a face image decoder based on the prior information and the feature information, the face recognition apparatus; and extracting, from a test image, facial shape-aware features in the inference step by using the trained second DNN.

12 Claims, 9 Drawing Sheets

(51) Int. Cl.
*G06F 18/213* (2023.01)
*G06F 18/214* (2023.01)
*G06N 3/08* (2023.01)
*G06V 40/16* (2022.01)

(52) U.S. Cl.
CPC .............. *G06F 18/217* (2023.01); *G06N 3/08* (2013.01); *G06V 40/168* (2022.01); *G06V 40/172* (2022.01)

(58) Field of Classification Search
CPC .... G06F 18/213; G06F 18/214; G06F 18/217; G06N 3/08; G06N 3/045
See application file for complete search history.

(56) References Cited

U.S. PATENT DOCUMENTS

| | | |
|---|---|---|
| 10,885,317 B2 | 1/2021 | Yoo et al. |
| 2015/0161435 A1 | 6/2015 | Jung et al. |
| 2018/0123797 A1 | 5/2018 | Noh et al. |
| 2019/0171868 A1* | 6/2019 | Taigman .............. G06V 40/173 |
| 2020/0097767 A1 | 3/2020 | Perry et al. |
| 2021/0067684 A1 | 3/2021 | Kim et al. |

FOREIGN PATENT DOCUMENTS

| | | |
|---|---|---|
| KR | 10-2019-0098858 | 8/2019 |
| KR | 10-2019-0106863 | 9/2019 |
| KR | 10-2020-0014889 | 2/2020 |

OTHER PUBLICATIONS

Li et al, Learning Face Image Super-Resolution through Facial Semantic Attribute Transformation and Self-Attentive Structure Enhancement, 2020, IEEE Transactions on Multimedia, pp. 1-16. (Year: 2020).*

Xia et al., Second-Order Non-Local Attention Networks for Person Re-Identification, 2019, IEEE CVF, pp. 1-10. (Year: 2019).*

Zhang et al, Global Learnable Pooling with Enhancing Distinctive Feature for Image Classification, 2020, IEEE Digital Object Identifier, pp. 1-9. (Year: 2020).*

Zhao et al, Fast and Precise Face Alignment and 3D Shape Reconstruction from a Single 2D Image, ECCV 2016 Workshops, Part II, LNCS 9914, pp. 590-503. (Year: 2016).*

* cited by examiner

METHOD AND APPARATUS FOR FACE RECOGNITION ROBUST TO ALIGNMENT STATUS OF THE FACE

CROSS-REFERENCE TO RELATED APPLICATION

This application claims priority to and the benefit of Korean Patent Application No. 10-2020-0141530 filed in the Korean Intellectual Property Office on Oct. 28, 2020, the entire contents of which are incorporated herein by reference.

BACKGROUND OF THE INVENTION

(a) Field of the Invention

The present disclosure relates to a face recognition method robust to face alignment and an apparatus therefor.

(b) Description of the Related Art

Conventional face recognition technology is performed through "a face detection, a preprocessing, a feature extraction, and a face recognition or a face matching". This face recognition pipelines basically includes processes of cropping a face region from the face detection result and normalizing it to a specific size. The normalization process is a process of performing an alignment of the eye coordinates horizontally through extracts of facial feature points in the cropped face, for example, eyes, nose, mouth, and so on and then normalizing it to the specific size. At this time, features for the face recognition is extracted based on the normalized face image.

When recognizing the face, face images having various alignment states, such that background is included or only a face area is tightly caught, may be input according to the face detection results. In order to be robust against this problem, even if precise alignment is performed using the key point coordinates obtained through a key point extraction, face images with different types of alignment conditions are generated depending on the error of the key point extraction algorithm.

Face images arranged in various forms have a sensitive effect on face recognition performance, such as being judged as different people when matching through the feature extract even though they are the same person. To deal with this problem, a part-based face recognition study has been conducted. However, since this study uses feature point information to select a part of the face, it depends on the feature point extract performance, and when setting partial patches based on the feature point, different types of image information can be included in the patches of a fixed size, so there is still an alignment issue.

In addition, in the case of a study to increase the accuracy of the feature point extraction, there is a drawback in that the computational complexity is very high compared to the proportion of the face alignment in the face recognition pipeline.

The above information disclosed in this Background section is only for enhancement of understanding of the background of the invention, and therefore it may contain information that does not form the prior art that is already known in this country to a person of ordinary skill in the art.

SUMMARY OF THE INVENTION

An embodiment provides a method for recognizing a face using a deep neural network.

Another embodiment provides an apparatus for recognizing a face using a deep neural network.

According to an embodiment, a method for recognizing a face using a deep neural network is provided. The method includes: estimating prior information of a facial shape from an input image cropped from an image including at least one face by using a first DNN of a face recognition apparatus; extracting feature information of facial appearance from the input image by using a second DNN of the face recognition apparatus; training, by using a face image decoder of the face recognition apparatus based on the prior information and the feature information, the face recognition apparatus so that a face image close to a optimally aligned face image is decoded; and extracting, from a test image, facial shape-aware features in an inference step by using the second DNN included in the trained face recognition apparatus.

The estimating prior information of a facial shape may include estimating a facial key point coordinate or a parsing map as the prior information to identify contour of elements of the face.

The training the face recognition apparatus may include performing training by updating parameters of the second DNN and the face image decoder.

The performing of the training may include obtaining the parameters through mini batch gradient descent scheme.

The performing of the training may include performing the training based on at least one loss function regarding training parameters of the first DNN, the second DNN, and the face image decoder.

The at least one loss function may include at least one of a cross-entropy loss function about the feature information extracted by the second DNN, a loss function in a feature alignment process, and a loss function in a pixel alignment process.

The feature alignment process may be a process of comparing a global average pooling (GAP) result for combination information of the prior information and the feature information and a GAP result of a feature map extracted from the second DNN.

The pixel alignment process may be a comparing process between the face image decoded by the face image decoder and the optimally aligned face image.

The extracting, from a test image, facial shape-aware features in an inference step may include: outputting a feature map from the feature information extracted by the second DNN by using an additional learner; outputting a GAP result from the feature map by using a global average pooling layer; and extracting the facial shape-aware features by using a fully connected layer from the GAP result.

According to another embodiment, an apparatus for recognizing a face using a deep neural network (DNN) includes processor and memory; wherein the processor executes a program stored in the memory to perform: estimating prior information of a facial shape from an input image cropped from an image including at least one face by using a first DNN; extracting feature information of the facial appearance from the input image by using a second DNN; training, by using a face image decoder based on the prior information and the feature information, the apparatus so that a face image close to an aligned face image is decoded; and extracting, from a test image, facial shape-aware features by using the second DNN included in the trained apparatus.

When the processor performs the estimating prior information of a facial shape, the processor may perform estimating a facial key point coordinate or a parsing map as the prior information to identify contour of elements of the face.

When the processor performs the training the apparatus, the processor may perform performing training by updating parameters of the second DNN and the face image decoder.

When the processor performs the performing of the training, the processor may perform obtaining the parameters through mini batch gradient descent scheme.

When the processor performs the performing of the training, the processor may perform performing the training based on at least one loss function regarding training parameters of the first DNN, the second DNN, and the face image decoder.

The at least one loss function may include at least one of a cross-entropy loss function about the feature information extracted by the second DNN, a loss function in a feature alignment process, and a loss function in a pixel alignment process.

The feature alignment process may be a process of comparing a global average pooling (GAP) result for combination information of the prior information and the feature information and a GAP result of a feature map extracted from the second DNN.

The pixel alignment process may be a comparing process between the face image decoded by the face image decoder and the optimally aligned face image.

When the processor performs the extracting, from a test image, facial shape-aware features, the processor may perform: outputting a feature map from the feature information extracted by the second DNN by using an additional learner; outputting a GAP result from the feature map by using a global average pooling layer; and extracting the facial shape-aware features by using a fully connected layer from the GAP result.

DETAILED DESCRIPTION OF THE EMBODIMENTS

Figure 1:
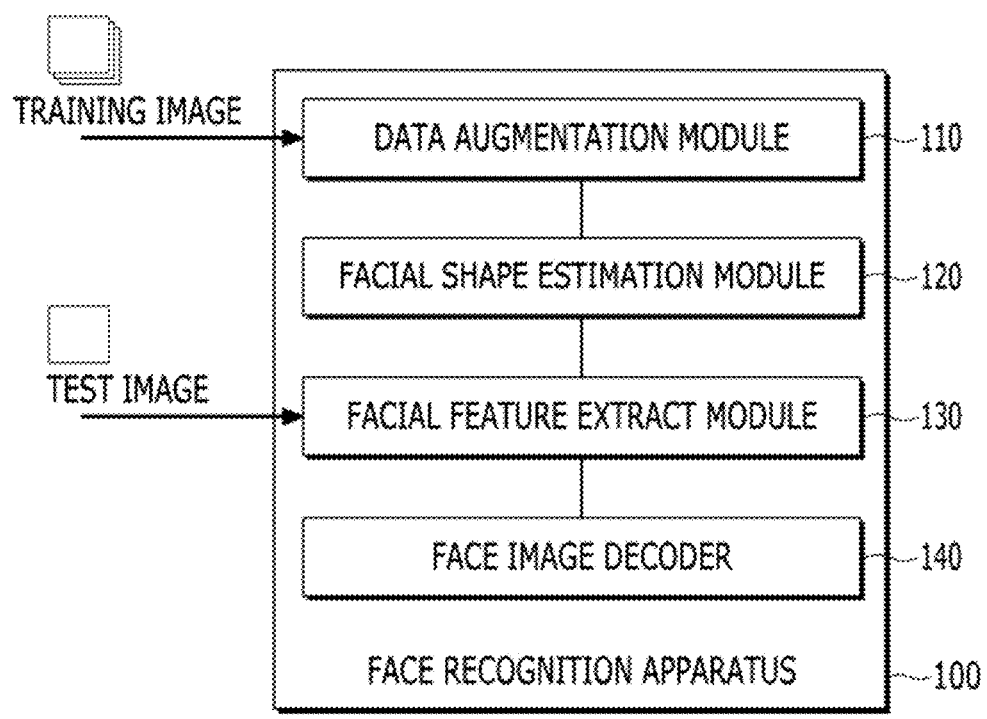
FIG. 1 is a block diagram illustrating a face recognition apparatus according to an embodiment.

Below, with reference to the accompanying figures, it will be described in detail so that a person of an ordinary skill in the technical field can easily implement the embodiment of the present description. However, the present description may be embodied in several different forms and is not limited to the embodiments described herein. In order to clearly explain this description in the figures, parts irrelevant to the description were omitted, and similar reference numerals were attached to similar parts throughout the specification.

In addition, unless explicitly described to the contrary, the word "comprise", and variations such as "comprises" or "comprising", will be understood to imply the inclusion of stated elements but not the exclusion of any other elements.

In addition, terms "module", " . . . device", " . . . unit" refers to a unit that processes at least one function or operation, which may be implemented as hardware or software or a combination of hardware and software.

The devices and apparatuses described in the embodiment may be composed of hardware including at least one processor, a memory, a communication device, and the like. The memory may store a program that is executed in combination with the hardware. The hardware may execute the program to execute the method according to the embodiment. The program may include instructions for implementing the method according to the embodiment described with reference to figures, and executes the method according to the embodiment in combination with hardware such as the processor and the memory.

Expressions written in the singular in this specification can be interpreted as singular or plural unless explicit expressions such as "one" or "single" are used.

In this specification, regardless of the drawing, the same figure number refers to the same component, and "and/or" includes each and at least one all combinations of the mentioned components.

In this specification, terms including an ordinal number such as first, second, and so on may be used to describe various configurations or components, but the configurations or components are not limited by the terms. The terms are used only for the purpose of distinguishing one configurations or components from another configurations or components. For example, the first component may be named as the second component without departing from the right range of the present description, and similarly, the second component may also be named as the first component.

In the flowchart described with reference to figures in this specification, the order of operations may be changed, several operations may be merged, some operations may be divided, and specific operations may not be performed.

FIG. 1 is a block diagram illustrating a face recognition apparatus according to an embodiment.

Referring to FIG. 1, the face recognition apparatus 100 according to an embodiment includes a data augmentation module 110, a facial shape estimation module 120, a facial feature extract module 130, and a face image decoder 140. The face recognition apparatus 100 may be trained by using a plurality of face images generated from image data (or data set) including a face region. Then, the trained facial feature extract module 130 of the face recognition apparatus 100 may extract features for recognizing a face from a test image (or target image).

Each of the facial shape estimation module 120, the facial feature extract module 130, and the face image decoder 140 may be deep neural networks (DNNs) including at least one layer. In this application, the facial shape estimation module 120 may be a first DNN or a facial shape estimation network, and the facial feature extract module 130 may be a second DNN or a facial feature extract network.

The facial feature extract module 130 of the face recognition apparatus 100 according to an embodiment may pre-recognize the shape of the face at the training stage through machine learning with the facial shape estimation module 120, and thus the trained facial feature extract module 130 may extract the features in which the shape of the faces is recognized in the test image without face alignment.

The data augmentation module 110 may create training images (or learning image data) by performing data augmentation on image data including the faces. In the training images, the face region may be randomly cropped, and position of the face region in each training image may be different. That is, face(s) in each training image may have various alignment types. One training image set may include a plurality of training images in which the face region is randomly cropped.

The facial shape estimation module 120 may use the training images (or the training image set) created by the data augmentation module 110 to estimate prior information of a facial shape.

The prior information may represent information about the shape of the face and may be determined depending on an alignment state of the faces in the training images. Feature information may represent information about features of the facial appearance used for face recognition. For example, the prior information of the facial shape may include information about the contour of the components of the faces. The feature information of the facial appearance may include feature descriptors of the face components. The face components may include eyes, eyebrows, nose, mouth, or teeth, and play an important role in characterizing the face of a user.

The DNN used when the facial shape estimation module 120 estimates the prior information of the facial shape from the augmented training images may use a loss function that minimizes a distance between features extracted from data geometrically transformed through the data augmentation.

The prior information of the facial shape estimated by the facial shape estimation module 120 and the feature information of the facial appearance extracted by the facial feature extract module 130 may be combined (or concatenated) according to at least one of stacking, pooling, or attention. The face image decoder 140 may train a face recognition model in a supervised learning method through the face images optimally aligned by using the combined information of the prior information of the facial shape and the feature information of the facial appearance.

The pooling method may be performed by a pooling operation (e.g., pooling for the maximum value/average value) for a two-dimensional (x, y) space and channel which uses information extracted through the two steps (the prior information of the facial shape and the feature information of the facial appearance).

In the attention method, attention weights for the two-dimensional (x, y) space and channel may be acquired through a training and features to which the weights are applied may be extracted from the prior information of the facial shape and the feature information of the facial appearance.

Since the facial shape estimation module 120 may generate the shape information of the faces and the facial feature extract module 130 may perform feature-focused learning based on the shape information, the trained ML (machine learning) model can extract facial features from the test image during the inference step, thereby there is no need to perform face alignment in the inference step. The facial features extracted from the test image may be stored in a database (DB) for training of the facial recognition apparatus later.

Figure 2:
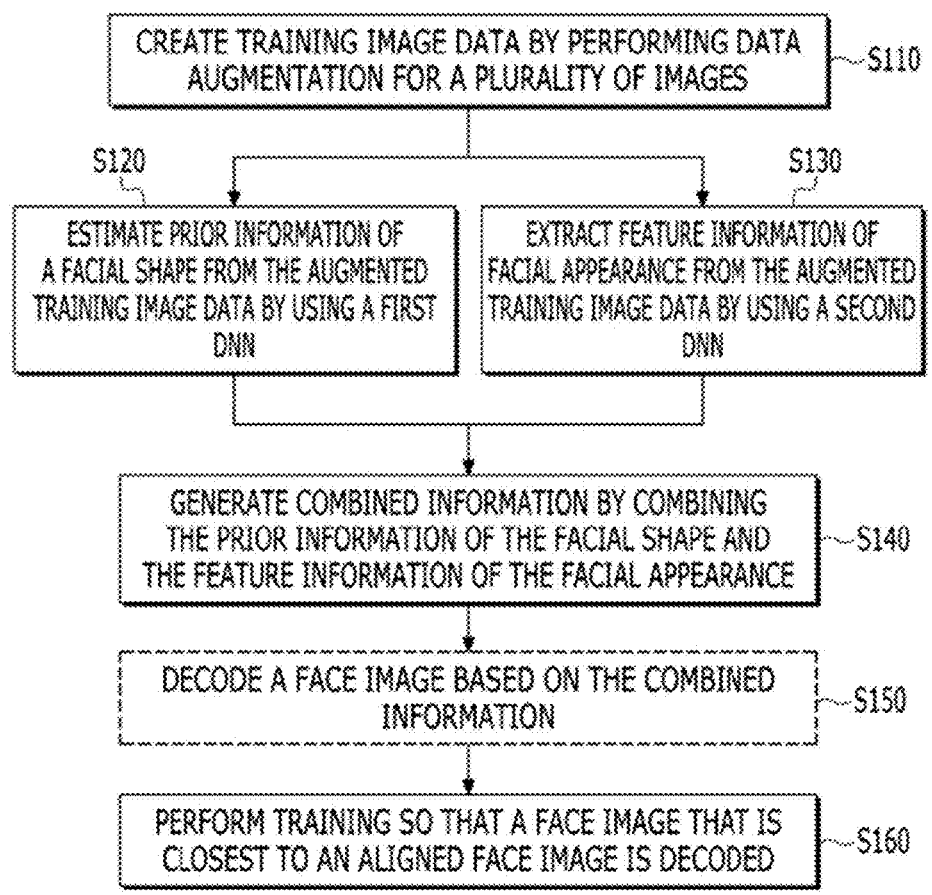
FIG. 2 is a flowchart illustrating a method for training of the face recognition apparatus according to an embodiment.
Figure 3A:
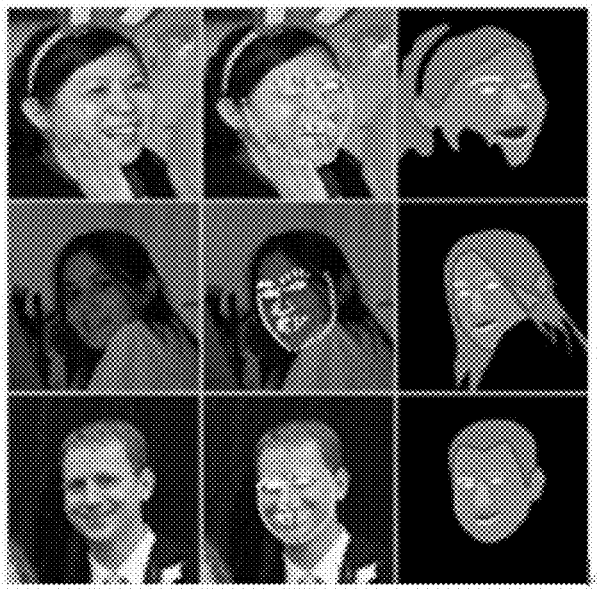
FIG. 3A, FIG. 3B, and FIG. 3C are schematic diagrams for extracting prior information of a facial shape according to an embodiment.
Figure 3A:
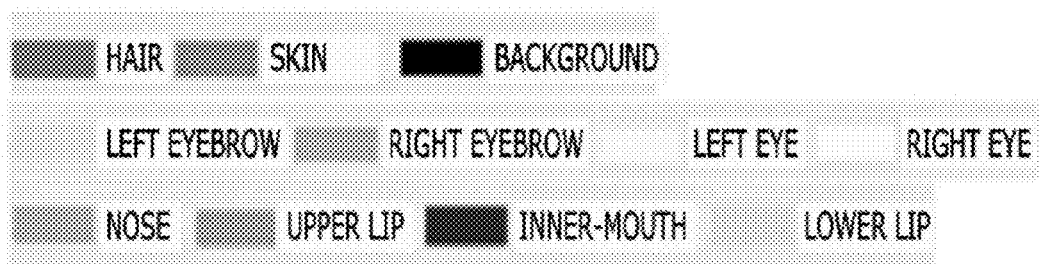
Figure 3B:
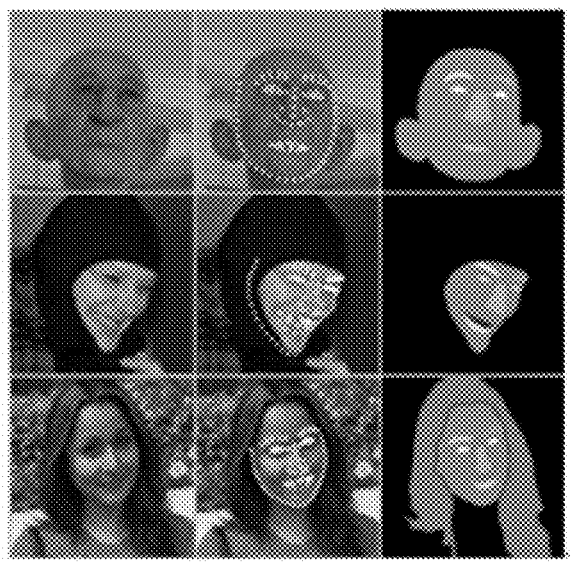
Figure 3B:
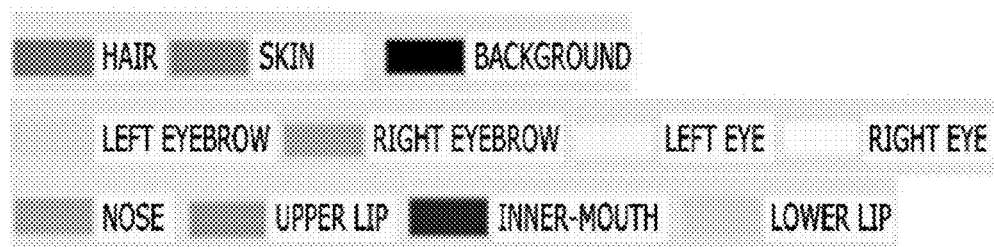
Figure 3C:
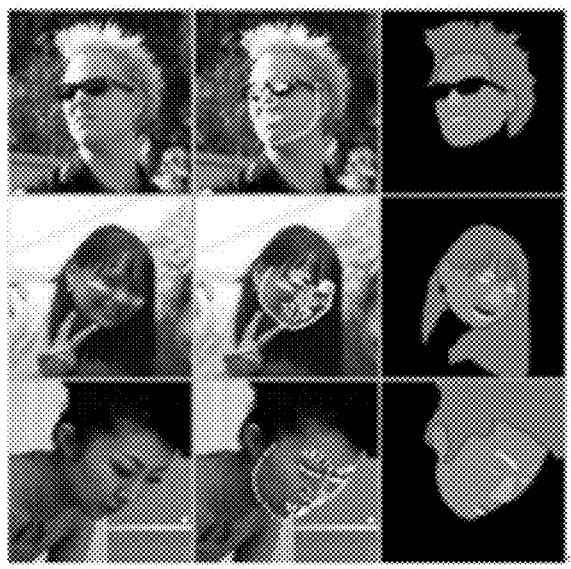
Figure 3C:
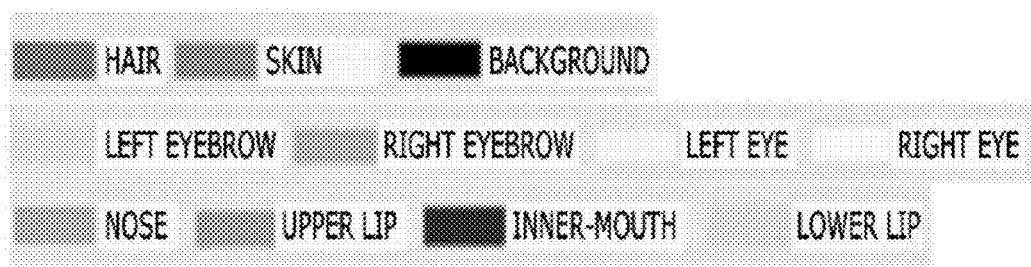

FIG. 2 is a flowchart illustrating a method for training of the face recognition apparatus according to an embodiment, and FIG. 3A to FIG. 3C are schematic diagrams for extracting the prior information of the facial shape according to an embodiment.

Referring to FIG. 2, the data augmentation module 110 may create training images (or a training image set) by performing the data augmentation on the plurality of images including the face region S110.

The data augmentation module 110 may create, from images containing the face region, the plurality of augmented training images. The data augmentation may be performed through geometric transformation of the face, for example, scaling, rotation, x-axis/y-axis position transformation, and the like.

The facial shape estimation module 120 may extract the prior information on the facial shape from the augmented training images using the first DNN (S120).

In step S120, the facial shape estimation module 120 may estimate information related to the shape of a face image, for example, facial key point coordinates or parsing map information to identify the contours of the face component as the prior information on the facial shape, so that the prior information of the facial shape is reflected to the training.

At this time, referring to FIG. 3A to FIG. 3C, the facial shape estimation module 120 may extract the facial key point coordinates such as the second column in the figures from the face image in the first column in the figures or estimate the parsing map such as the third column in the figures.

As the facial key point coordinates, the two-dimensional (x, y) coordinate information of the eyes/nose/mouth or feature map information for each face component may be utilized.

As the parsing map, pixel-unit segmentation information or a feature map for each part (or component) of the face may be utilized.

The facial feature extract module 130 may extract the feature information of the facial shape from the augmented training images by using the second DNN S130. When learning the facial feature extract module 130 according to the embodiment, the prior information about the facial shape obtained by the first DNN is considered, so that the feature information of the facial appearance to which the prior information is focused may be extracted.

Then, the prior information of the facial shape of the facial shape estimation module 120 and the feature information of the facial appearance of the facial feature extract module 130 may be combined S140.

The face image decoder 140 may decode a face image based on the combined information S150. Step S150 may be selectively performed.

Then, the face recognition apparatus 100 may be trained by updating parameters so that the face image decoder 140 can decode the face image that is closest to the optimally aligned face image S160. The face recognition apparatus 100 may update parameters of the second DNN and the face image decoder. According to the embodiment, the parameters of the first DNN may not be updated so as to obtain stable facial key points.

The face image decoder 140 according to the embodiment may generate the face image close to the optimally aligned face image by decoding the combined information of the prior information estimated from variously arranged training images and the feature information extracted from the training images. That is, the face recognition model according to the embodiment may perform supervised learning by comparing the decoded face images based on the combined information of the prior information and the feature information with the optimally aligned face image, so that the optimally aligned face image can be created from the unaligned face images.

When step S150 is performed, the face image decoder 140 may be trained based on the decoded face images and the optimally aligned face images. Here, the face recognition apparatus may be trained through a loss function that minimizes differences between the face image decoded through a feature decoding and the optimally aligned face image.

The face recognition apparatus 100 may perform learning based on the combined feature information and person information label. The person information label may include person information corresponding to a person in the plurality of images used in step S110. The face recognition apparatus 100 may use the face recognition model trained by large capacity face image data such as VGGFace2 or MS-Celeb-1M as an initial face recognition model, and perform fine-tuning on the initial face recognition model.

The face recognition apparatus 100 may be trained in the supervised learning method by using a face image, the person information, and the combined feature information. In order to obtain the same feature from the augmented face training images that are geometrically transformed by the data augmentation, a loss function for minimizing the distance between features may be used during the training of the face recognition apparatus 100.

For the training of the first DNN, the second DNN, and the face image decoder, a loss function that minimizes distances between feature information respectively extracted from the training images geometrically transformed through the data augmentation may be used.

As such, unlike the conventional face recognition method that merely extracts facial features using data augmentation, the face recognition apparatus 100 according to the embodiment may learn by combining the prior information of the facial shape and the feature information of the facial appearance and by fixing a structure of the ML model and the parameters, so that the facial feature learning robust to the face alignment may be performed.

Figure 4:
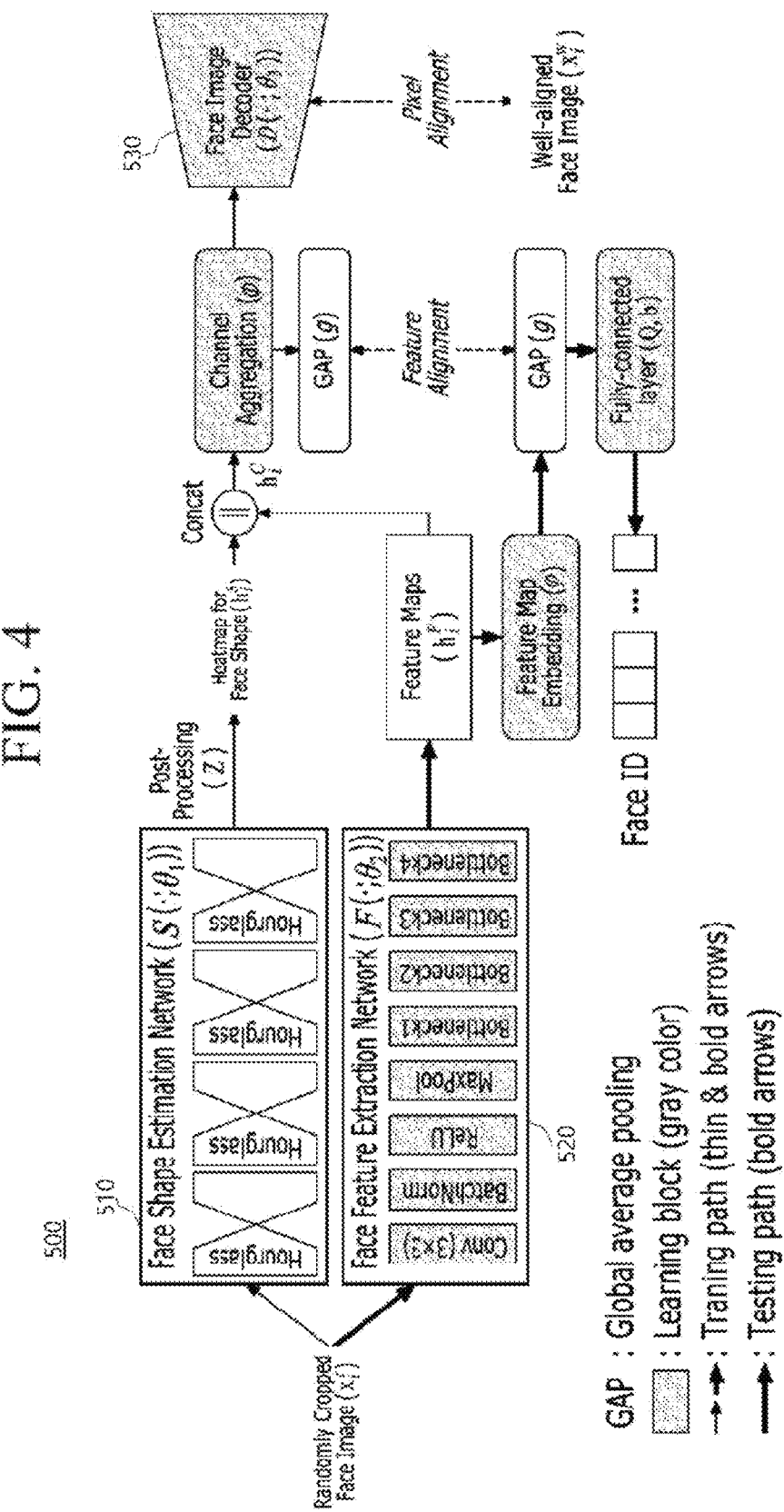
FIG. 4 is a schematic diagram illustrating a feature learning method of the face recognition apparatus according to an embodiment.
Figure 5:
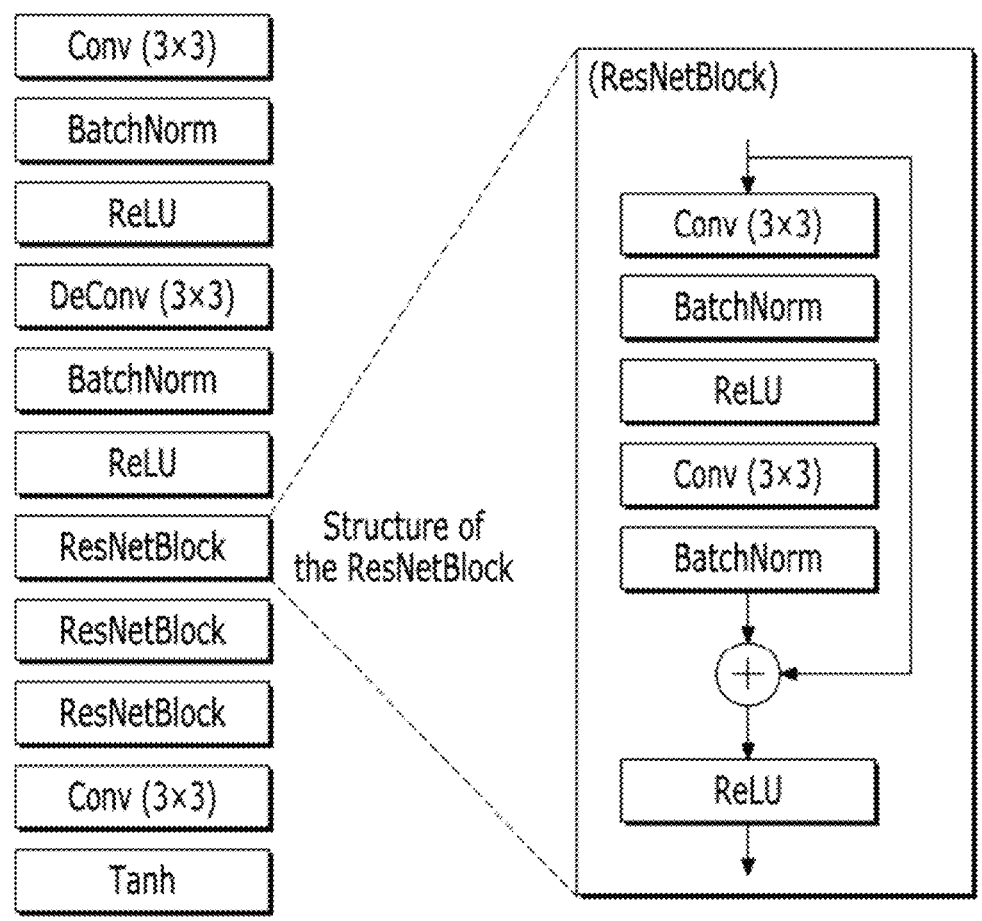
FIG. 5 is a block diagram illustrating a face image decoder according to an embodiment.

FIG. 4 is a schematic diagram illustrating a feature learning method of the face recognition apparatus according to an embodiment and FIG. 5 is a block diagram illustrating the face image decoder according to an embodiment.

Referring to FIG. 4, the face recognition apparatus 500 according to an embodiment includes a facial shape estimation network 510, a facial feature extract network 520, and a face image decoder 530.

The facial shape estimation network 510 may infer coordinates of face key points from a face image as prior information of the facial shape (or facial shape prior). The face image $x_i^r$ input to the facial shape estimation network 510 may be one of images randomly cropped around the face region in images including the face. The coordinates of the facial key points may be expressed as a heat map on the facial shape. The facial feature extract network 520 may output the feature information of the face appearance (or face appearance feature) based on the backbone network.

The face image decoder 530 may reconstruct the decoded face image $\tilde{x}_i^w$ based on the outputs of the facial shape estimation network and the facial feature extract network. The characteristic of the decoded face image may be modeled through pixel alignment with the optimally aligned face image $x_i^w$. The optimally aligned face image $x_i^w$ may be the most optimally aligned face image among randomly cropped images $x_i^r$.

Facial shape-aggregated features may be simultaneously connected to the facial feature extract network through feature alignment, and the facial feature extract network 520 may train facial shape-aware features (i.e., features in which the facial shape is recognized) through the facial shape-aggregated features in the training phase, and then the facial feature extract network 520 may extract the facial shape-aware features without the help of the facial shape estimation network 510 in the inference phase. That is, the facial feature extract network 520 may perform the facial feature extraction that is strong against facial misalignment without an explicit facial alignment process in the inference step by learning the characteristics of the optimally aligned facial images in an end-to-end manner.

In FIG. 4, both the arrows indicated by thin solid lines and arrows indicated by thin dot lines are the paths of the training phase, and the arrows indicated by thick solid lines are the paths of the inference phase. The face image $x_i^r$ may be input to both the facial shape estimation network 510 and the facial feature extract network 520 in the training stage, but the test image may be input only to the facial feature extract network 520 in the inference stage. That is, in the inference step, the facial feature extract network 520 may extract facial features from the test image without the help of the facial shape estimation network 510.

Hereinafter, the facial shape estimation network 510 will be described.

The facial shape estimation network 510 may use a face alignment network (FAN) composed of a plurality of hourglass modules to estimate the prior information on the facial shape. Other types of face alignment networks may also be used in the facial shape estimation network 510, but the present description is not limited thereto. In this case, the parameters pre-trained in the face alignment network may not be changed during the training in order to stably obtain the prior information.

For an i-th face image $x_i^r$ (r means that the input image is randomly cropped from images containing faces) input to the facial shape estimation network 510, for), the facial shape estimation network 510 having $\theta_1$ as a parameter may infer the heat map corresponding to a plurality of facial key points (e.g., 68 facial key points). Here, the heat map may include the number of channels corresponding to the facial key points.

Post-processing such as Gaussian blurring, resizing, and channel conversion may be applied for the heat map. For example, a 68-channel heat map may be blurred by a Gaussian kernel using σ for positions of the peak points (i.e., some positions of the facial key points) of the heat map, so that the importance of the area around the key points may be emphasized. Then, the size of the heat map may be adjusted to match the size of the feature map of the facial feature extract network 520 (e.g., 56×56). The heat map for the estimated key points may be converted into a plurality of image channels for efficient consumption of the memory. For example, the plurality of image channels may include 1) a heat map of an eye part (including eyes and eyebrows, etc.), 2) a heat map of a nose and a mouth part, and 3) a heat map of a face boundary. The heat map ($h_i^S$) determined by the facial shape estimation network 510 may be expressed as Equation 1 below.

$$h_i^S = Z[S(x_i^r; \theta_1)] \hspace{2cm} \text{(Equation 1)}$$

In Equation 1, S may represent the feedforward calculation operation of the FAN, and Z may represent the post-processing functions such as the Gaussian blurring, the resizing, and the channel transformation. $\theta_1$ may be a parameter of the facial shape estimation network.

The facial feature extract network 520 will be described below. The facial feature extract network 520 may extract the feature information of the face appearance based on ResNet, and other types of artificial neural networks other than the ResNet may be used, and the present description is not limited thereto. The facial feature extract network 520 may include a 2D convolution layer, a batch normalization layer, a ReLU activation layer, a max-pooling layer, and a plurality of bottleneck layers.

The number of channels in each layer and the stride of the bottleneck layer in the facial feature extract network 520 may be modified for alignment of the feature map and the heat map with respect to the facial shape information. For example, 512 channels may be modified to 256 channels in the fourth bottleneck layer, and the stride of the bottleneck layer may be set to 1 instead of 2. For the i-th face image $x_i^r$, the feature map $h_i^F$ of the facial appearance may be expressed in Equation 2 below.

$$h_i^F = F(x_i^r; \theta_2) \quad \text{(Equation 2)}$$

In equation 2, $\theta_2$ may be a parameter of the facial feature extract network.

The face image decoder 530 will be described below. The face image decoder 530 may learn the characteristic of the optimally aligned face image $x_i^w$ corresponding to the input image $x_i^r$ by using the feature map of $h_i^S$ and $h_i^F$. Before the decoding, $h_i^S$ and $h_i^F$ may be concatenated. Equation 3 below shows an example of a concatenated feature map $h_i^C$.

$$h_i^C = [h_i^S \| h_i^F] \quad \text{(Equation 3)}$$

Here, ∥ may denote channel concatenation of the outputs of the facial shape estimation network 510 (e.g., the prior information of the facial shape) and the output of the facial feature extract network 520 (e.g., the feature information of the facial appearance). @@@∥Then, the concatenated feature map $h_i^C$ may be aggregated by a channel aggregation layer ϕ for the shape-aware features of the faces. The channel aggregation layer may include the convolution layer and the batch normalization layer. The size of the convolution layer may be 1×1. The channel aggregation layer may aggregate the prior information of the facial shape and the feature information of the facial appearance for each channel. When the input to the face image decoder 530 is ϕ($h_i^C$), a decoding result of the face image decoder 530 is as shown in Equation 4 below.

$$\tilde{x}_i^w = D(\phi(h_i^C); \theta_3) \quad \text{(Equation 4)}$$

In equation 4, $\theta_3$ may be a parameter of the face image decoder (D) 530.

Referring to FIG. 5, the face image decoder 530 according to an embodiment may include a first convolution layer, a deconvolution layer, a ResNet, and a second convolution layer. The batch normalization layers and the ReLU layers may be included between the first convolution layer and the deconvolution layer and between the deconvolution layer and the ResNet, respectively.

For example, the first convolution layer of the face image decoder 530 may reduce the number of concatenated feature maps to a predetermined number. Then, the deconvolution layer may increase resolution of the image to a predetermined ratio by up-sampling the concatenated feature map. Then, residual blocks of the ResNet may decode the feature map. Finally, the second convolution layer may reconstruct the decoded face image $\tilde{x}_i^w$. The process of reconstructing the decoded face image $\tilde{x}_i^w$ from the concatenated feature map of the randomly cropped face image $x_i^r$ may be referred to as the pixel alignment.

The face recognition apparatus 500 according to the embodiment may further perform a feature alignment process in the training step in order to efficiently extract facial features from the face image that is not well aligned. The facial recognition apparatus 500 according to the embodiment may train the facial feature extract network 520 to be guided by the channel aggregation features through the feature alignment process.

Since the channel aggregation feature may include the prior information of the facial shape and the feature information of the facial appearance, additional learning processor (or a feature map embedder) φ may learn a function that maps the feature information $h_i^F$ of the facial appearance extracted by the facial feature extract network 520 to a guide ϕ($h_i^C$). For efficient computation, the feature map φ($h_i^F$) and the feature map ϕ($h_i^C$) may be transformed into a feature vector by global average pooling (GAP).

Table I shows details of a structure to be learned by the face recognition apparatus 500 according to the embodiment.

TABLE 1

| network | the name of layers | the size of outputs | operations |
|---|---|---|---|
| Face feature extract network(F) | Conv 1 | 112 × 112 | 7 × 7, 64, stride 2 (BatchNorm, ReLU) |
| | Conv2_x (Bottleneck) | 56 × 56 | 3 × 3 Max Pooling, stride 2 |
| | | | $\begin{bmatrix} 1\times1, & 32, & \text{stride 1} \\ 3\times3, & 32, & \text{stride 3} \\ 1\times1, & 128, & \text{stride 1} \end{bmatrix} \times 3$ |
| | Conv3_x(Bottleneck) | 56 × 56 | $\begin{bmatrix} 1\times1, & 64, & \text{stride 1} \\ 3\times3, & 64, & \text{stride 3} \\ 1\times1, & 256, & \text{stride 1} \end{bmatrix} \times 4$ |
| | Conv4_x(Bottleneck) | 56 × 56 | $\begin{bmatrix} 1\times1, & 128, & \text{stride 1} \\ 3\times3, & 128, & \text{stride 3} \\ 1\times1, & 512, & \text{stride 1} \end{bmatrix} \times 6$ |

TABLE 1-continued

| network | the name of layers | the size of outputs | operations |
|---|---|---|---|
| | Conv5_x(Bottleneck) | 56 × 56 | $\begin{bmatrix} 1\times1, & 256, & \text{stride } 1 \\ 3\times3, & 256, & \text{stride } 3 \\ 1\times1, & 1024, & \text{stride } 1 \end{bmatrix} \times 3$ |
| Face image decoder (D) | Conv1 | 56 × 56 | 3 × 3, 64, stride 1 (BatchNorm, ReLU) |
| | DeConv | 112 × 112 | 3 × 3, 64, stride 2 (BatchNorm, ReLU) |
| | Conv2_x(Basic) | 112 × 112 | $\begin{bmatrix} 3\times3, & 64, & \text{stride } 1 \\ 3\times3, & 64, & \text{stride } 1 \end{bmatrix} \times 2$ |
| | Conv3_x(Basic) | 112 × 112 | $\begin{bmatrix} 3\times3, & 64, & \text{stride } 1 \\ 3\times3, & 64, & \text{stride } 1 \end{bmatrix} \times 2$ |
| | Conv4_x(Basic) | 112 × 112 | $\begin{bmatrix} 3\times3, & 64, & \text{stride } 1 \\ 3\times3, & 64, & \text{stride } 1 \end{bmatrix} \times 2$ |
| | Conv5 | 112 × 112 | 3 × 3, 3, stride 1(Tanh) |
| Fearture map embedder ($\varphi$) | Conv | 56 × 56 | 1 × 1, 512, stride 1 (BatchNorm, ReLU) |
| channel aggregation layer($\phi$) | Conv | 56 × 56 | 1 × 1, 512, stride 1 (BatchNorm) |
| Fully connected layer (Q, b) | — | 1 × 1 | Global Average Pooling, 8631 (SoftMax) |

According to an embodiment, three loss functions may be use or the raining phase of the face recognition apparatus 500. The three loss functions may include a cross-entropy loss function, a loss function in the pixel alignment, and a loss function in the feature alignment used when the face images in which the features have been extracted (or the feature information of the facial appearance) are classified.

The cross-entropy loss function may be used when the face image in which the features have been extracted by the facial feature extract network 520 and the GAP (or the feature information of the facial appearance) is classified as one of the classes for embedded features $g(\varphi(h_i^F))$, and may be expressed as Equation 5 below.

$$\mathcal{L}_{cls} = -\frac{1}{nc}\sum_{\forall i}\sum_{\forall c} y_i^c \log \tilde{y}_i^c \quad \text{(Equation 5)}$$

In equation 5, $y_i^c \in \{0, 1\}$ may be a c-th element of a one-hot vector corresponding to ground truth class label of the i-th sample, and $\tilde{y}_i^c$ may be a c-th element of a one-hot vector of the label estimated by a SoftMax function. An example of the Softmax function may be shown in Equation 6 below.

$$\text{SoftMax}(Q^T g(\varphi(h_i^F))+b) \quad \text{(Equation 6)}$$

Referring to equation 6, Q may be the weight matrix of the fully connected layer, and b may be the bias vector of the fully connected layer.

In equation 5, n may be the number of samples used for training in one epoch, and $\varepsilon$ may be the number of classes.

The L1 loss between the optimally aligned face image and the decoded face image, that is, a loss function in the pixel alignment, used for training of the face image decoder 530 may be expressed as Equation 7 below.

$$\mathcal{L}_{pa} = \frac{1}{n}\sum_{\forall i} \|x_i^w - \tilde{x}_i^w\|_1 \quad \text{(Equation 7)}$$

In equation 7, $\tilde{x}_i^w$ may be the same as equation 4. The pixel alignment process may be a process of comparing the optimally aligned face image with the face image decoded by the face image decoder 530.

In addition, a loss function in the feature alignment for learning facial shape-aware features may be expressed as Equation 8 below.

$$\mathcal{L}_{fa} = \frac{1}{n}\sum_{\forall i} \|g(\phi(h_i^C)) - g(\varphi(h_i^F))\|_2^2 \quad \text{(Equation 8)}$$

By Equation 8, the feature $g(\phi(h_i^C))$ in which both the face image and the prior information of the facial shape have been considered may be transformed to the feature $g(\varphi(h_i^F))$ from the facial feature extract network 520. The feature alignment process may be a process of comparing the global average pooling result $g(\phi(h_i^C))$ of the channel aggregated feature map $h_i^C$ and the global average pooling result $g(\varphi(h_i^F))$ of the feature map $h_i^F$ from the facial feature extract network 520.

The total loss (L) for training of the face recognition apparatus 500 according to the embodiment may be expressed as Equation 9 below using the three loss functions.

$$L = L_{cls} + L_{pa} + L_{fa} \quad \text{(Equation 9)}$$

The face recognition apparatus 500 according to the embodiment may obtain a learning parameter (i.e., $\Theta = \{\theta_2, \theta_3, \phi, \varphi, Q, b\}$) for optimizing Equation 10 below, for example, through a mini-batch gradient descent method.

$$\Theta^* = \underset{\Theta}{\operatorname{argmin}} \mathcal{L} \qquad \text{(Equation 10)}$$

Then, the additional learning processor, the GAP layer, and the fully-connected layer may extract the facial shape-aware features of the test image from the facial information $h_i^F$ of the facial appearance output from the facial feature extract network. That is, the face recognition apparatus 500 according to the embodiment, in the inference stage, may output the feature map $\varphi(h_i^F)$ using the additional learning processor, and output the GAP result $g(\Phi(h_i^F))$ of the feature map using the GAP layer, and then extract the facial shape-aware features from the test image using the fully connected layer to which the parameters Q and b are to be updated.

In the training stage, the face recognition apparatus 500 may learn the features of a well-aligned or optimally aligned face images by decoding the combined feature information based on the prior information of the facial shape and the feature information of the facial appearance, and this may correspond to the pixel alignment process. Through the feature alignment process, the facial feature extract network may learn the facial shape-aware features when a face image is input for the face recognition.

In the inference stage, a facial feature vector that is invariant with respect to the facial alignment may be extracted from the facial images based on the trained network. According to the present description, since the facial alignment process is not explicitly required in the inference stage, the facial features can be efficiently extracted with strong resistance to the facial misalignment.

Figure 6:
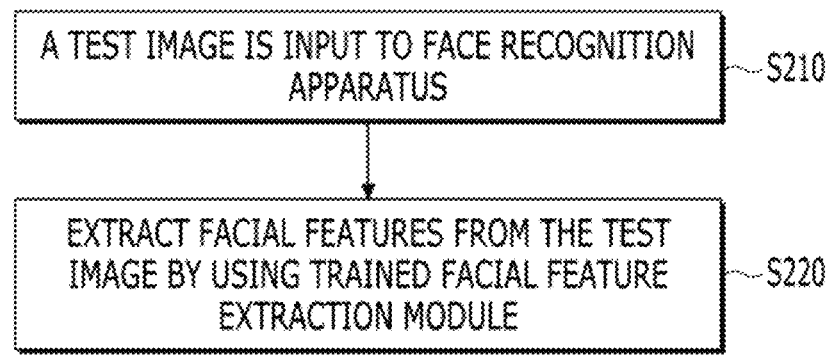
FIG. 6 is a flowchart of an inference step of the face recognition apparatus according to an embodiment.

FIG. 6 is a flowchart of an inference step of the face recognition apparatus according to an embodiment.

The face recognition method in FIG. 6 may be performed by the facial feature extract module 130 without the operation of the facial shape estimation module 120.

The facial feature extract module 130 according to the embodiment may extract the facial features from a test image based on parameters updated through training. First, when the test image including a facial region is input to the facial feature extract module 130 S210, the facial feature extract module 130 may extract the facial features from the test image S220.

The facial feature extract module 130 may perform the extraction of the facial features focused on the facial shape by using the parameter updated in the training stage.

Since the facial feature extract module 130 according to the embodiment can extract the facial features based on the feature information robust to the facial alignment states, the facial features can be accurately extracted in the inference step without performing the facial alignment.

Figure 7:
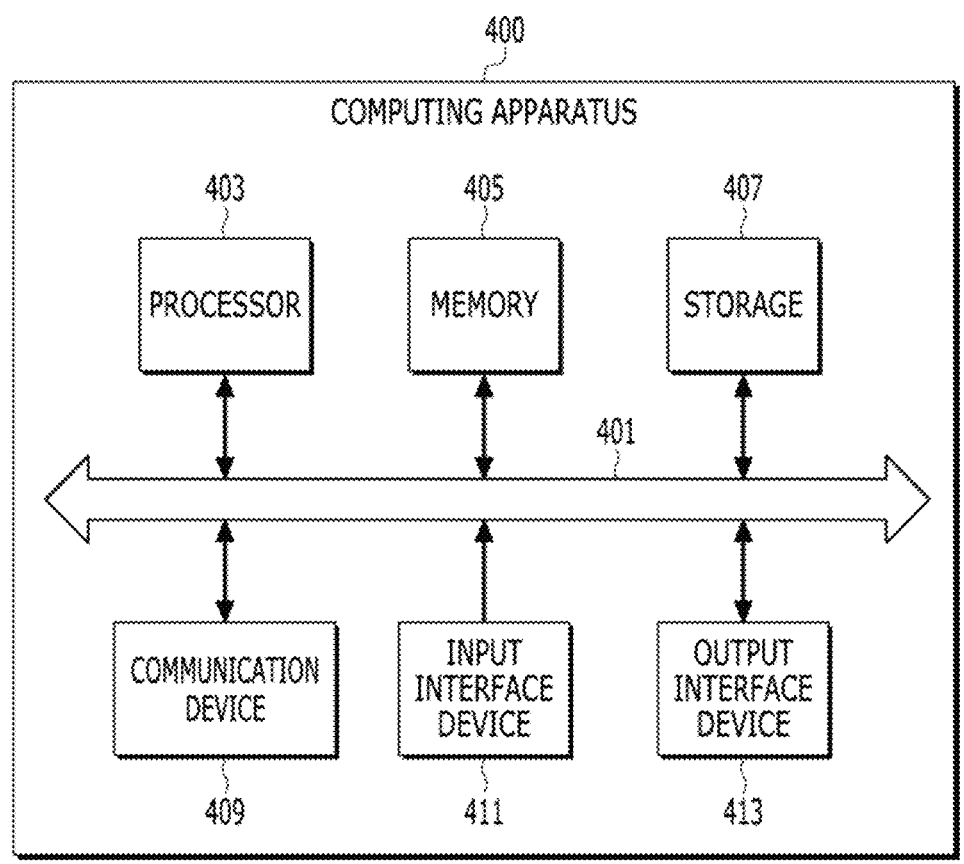
FIG. 7 is a block diagram illustrating components of the face recognition apparatus according to another embodiment.

FIG. 7 is a block diagram illustrating hardware components of a face recognition apparatus according to another embodiment.

The face recognition apparatus according to an embodiment may be implemented as a computer device, for example, a computer-readable medium.

referring to FIG. 7, the computer device 400 may include at least one of a processor 403, a memory 405, a storage 407, a communication apparatus 409, an input interface device 411 and an output interface device 413 communicating through the bus 401.

In addition, each constituent element may not be connected to the common bus 401 but to the processor 403 through an individual interface or individual bus.

The processor 403 may execute a program instruction (program command) stored in at least one of the memory 405 and the storage 407.

The processor 403 may mean a central processing unit (CPU) or a dedicated processor on which methods according to embodiments are performed. Such a processor 403 is shown in FIG. 1 to FIG. 4 can be configured to implement the corresponding function in the method described based on.

The memory 405 is connected to the processor 403 and stores various information related to the operation of the processor 403. The memory 405 may store an instruction word to be executed by the processor 403 or may temporarily store an instruction word by loading an instruction word from the storage 407. The processor 403 can execute instructions stored in or loaded from memory 405. The memory 405 may include read only memory (ROM) and random-access memory (RAM).

The memory 405/storage 407 can be located inside or outside the processor 403, and can be connected to the processor 403 through various known means. The memory 405/storage 407 may be configured to store facial shape information, facial feature information, combined feature information and face recognition model generated according to the learning of the learning process.

The communication apparatus 409 may transmit or receive a wired signal or a wireless signal.

On the other hand, the embodiment is not implemented only through the apparatus and/or method described so far, but a program realizing a function corresponding to the configuration of the embodiment or may be implemented through a recording medium in which the program is recorded, such implementation is from the description of the above-described embodiment, the present invention can be easily implemented by those skilled in the art to which the present invention belongs.

Specifically, the method according to the embodiment (e.g., block diagram editing method, on-chip network design method, etc.) is implemented in the form of a program instruction that can be performed through various computer means, and can be recorded in a computer-readable medium.

The computer readable medium may include program instructions, data files, data structures, etc. alone or in combination.

The program instructions recorded on the computer readable medium may be specially designed and configured for the embodiment, or may be known and available to those skilled in the art of computer software.

The computer readable recording medium may include a hardware device configured to store and execute program instructions. For example, a computer-readable recording medium includes magnetic media such as hard disks, floppy disks and magnetic tapes, optical recording media such as CD-ROMs and DVDs, and optical disks such as floppy disks. It may be magneto-optical media, ROM, RAM, flash memory, or the like. The program instruction may include not only machine language code such as generated by a compiler, but also high-level language code that can be executed by a computer through an interpreter or the like.

Although the embodiment has been described in detail above, the scope is not limited thereto, and various modifications and improved forms of a person of an ordinary skill in the art using the basic concept defined in the following claims range also belong to the scope.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A method for recognizing a face using a deep neural network (DNN), the method comprising:
estimating prior information of a facial shape from an input image cropped from an image including at least one face by using a first DNN of a face recognition apparatus;
extracting feature information of facial appearance from the input image by using a second DNN of the face recognition apparatus;
training, by using a face image decoder of the face recognition apparatus based on the prior information and the feature information, the face recognition apparatus so that a face image close to a optimally aligned face image is decoded; and
extracting, from a test image, facial shape-aware features in an inference step by using the second DNN included in the trained face recognition apparatus,
wherein:
the training the face recognition apparatus comprises
performing trainiig by updating parameters of the second DNN and the face image decoder,
wherein:
the performing of the training comprises
performing the training based on at least one loss function regarding training parameters of the first DNN, the second DNN and the face image decoder,
wherein:
the at least one loss function includes a cross-entropy loss function about the feature information extracted by the second DNN, a loss function in a feature alignment process, and a loss function in a pixel alignment process,
wherein:
the cross-entropy loss function is used when classifying the feature information of the facial appearance as one of classes for embedded features,
the loss function in a feature alignment process is used when training the facial shape-aware features, and
the loss function in a pixel alignment process is used when training the face image decoder.

2. The method of claim 1, wherein:
the estimating prior information of a facial shape comprises
estimating a facial key point coordinate or a parsing map as the prior information to identify contour of elements of the face.

3. The method of claim 1, wherein:
the performing of the training comprises
obtaining the parameters through mini batch gradient descent scheme.

4. The method of claim 1, wherein
the feature alignment process is a process of comparing a global average pooling (GAP) result for combination information of the prior information and the feature information and a GAP result of a feature map extracted from the second DNN.

5. The method of claim 1, wherein:
the pixel alignment process is a comparing process between the face image decoded by the face image decoder and the optimally aligned face image.

6. The method of claim 1, wherein:
the extracting, from a test image, facial shape-aware features in an inference step comprises:
outputting a feature map from the feature information extracted by the second DNN by using an additional learner;
outputting a GAP result from the feature map by using a global average pooling layer; and
extracting the facial shape-aware features by using a fully connected layer from the GAP result.

7. An apparatus for recognizing a face using a deep neural network (DNN), the apparatus comprising:
processor and memory;
wherein the processor executes a program stored in the memory to perform:
estimating prior information of a facial shape from an input image cropped from an image including at least one face by using a first DNN;
extracting feature information of the facial appearance from the input image by using a second DNN;
training, by using a face image decoder based on the prior information and the feature information, the apparatus so that a face image close to an aligned face image is decoded; and
extracting, from a test image, facial shape-aware features by using the second DNN included in the trained apparatus,
wherein when the processor performs the training the apparatus the processor performs
performing training by updating parameters of the second DNN and the face image decoder,
wherein when the processor performs the performing of the training, the processor performs
performing the training based on at least one loss function regarding training parameters of the first DNN, the second DNN, and the face image decoder,
wherein the at least one loss function includes at least one of a cross-entropy loss function about the feature information extracted by the second DNN, a loss function in a feature alignment process, and a loss function in a pixel alignment process,
wherein:
the cross-entropy loss function is used when classifying the feature information of the facial appearance as one of classes for embedded features,
the loss function in a feature alignment process is used when training the facial shape-aware features, and
the loss function in a pixel alignment process is used when training the face image decoder.

8. The apparatus of claim 7,
wherein when the processor performs the estimating prior information of a facial shape, the processor performs
estimating a facial key point coordinate or a parsing map as the prior information to identify contour of elements of the face.

9. The apparatus of claim 7,
wherein when the processor performs the performing of the training, the processor performs
obtaining the parameters through mini batch gradient descent scheme.

10. The apparatus of claim 7, wherein
the feature alignment process is a process of comparing a global average pooling (GAP) result for combination information of the prior information and the feature information and a GAP result of a feature map extracted from the second DNN.

11. The apparatus of claim 7, wherein
the pixel alignment process is a comparing process between the face image decoded by the face image decoder and the optimally aligned face image.

12. The apparatus of claim 7,
wherein when the processor performs the extracting, from a test image, facial shape-aware features, the processor performs:
outputting a feature map from the feature information extracted by the second DNN by using an additional learner;
outputting a GAP result from the feature map by using a global average pooling layer; and
extracting the facial shape-aware features by using a fully connected layer from the GAP result.

* * * * *